United States Patent Office 3,637,840
Patented Jan. 25, 1972

3,637,840
PROCESS FOR PRODUCING BIS-(DIMETHYL-AMINO)-PHOSPHORYL FLUORIDE
Gerhard Kunstle, Hellmuth Spes, and Alfred Trommet, Burghausen, Upper Bavaria, Germany, assignors to Wacker-Chemie G.m.b.H., Munich, Bavaria, Germany
No Drawing. Filed Apr. 3, 1969, Ser. No. 813,331
Claims priority, application Germany, Apr. 24, 1968,
P 17 68 278.9
Int. Cl. C07f 9/34
U.S. Cl. 260—543 F                 3 Claims

ABSTRACT OF THE DISCLOSURE

Process for producing bis-(dimethylamino)-phosphoryl fluoride by reacting bis-(dimethylamino)-phosphoryl chloride with an aqueous alkali fluoride solution or an ammonium fluoride solution, the reaction being performed at a temperature of 60–110° C. in a reaction-inert water-insoluble solvent for bis-(dimethylamino)-phosphoryl chloride, and the reaction mixture containing 30 to 75% water referred to the water-free alkali or ammonium fluoride and a phosphate buffer solution of primary and secondary phosphates and dimethylamine hydrochloride.

BACKGROUND OF THE INVENTION

Bis-(dimethylamino)-phosphoryl fluoride, commercially known under the names Pestox 14[R], Terra-Sytam[R] or Hanane, is an insecticide with a strong systemic and gas effect.

The compound can be made by reacting bis-(dimethylamino)-phosphoryl chloride with alkali or ammonium fluoride in the presence of water, in accordance with the equation

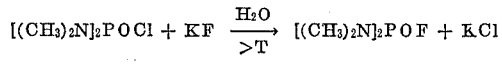

(see BIOS Final Report No. 714, 1947, p. 41).

A further development of the method consists of carrying out the reaction in the presence of an inert, water-insoluble solvent for bis-(dimethylamino)-phosphoryl fluoride (see G. Schrader, "Die Entwicklung neuer, Insektizider Pohphorsäureester" ("The Development of new Insecticide Phosphoric Acid Esters"), Verlag Chemie G.m.b.H., Weinheim/Bergstrasse, 1963, p. 96, British Pat. 742,699.

Under the conditions of the method, however, bis-(dimethylamino)-phosphoryl chloride as well as bis-(dimethylamino)-phosphoryl fluoride are hydrolyzed, which causes yield losses.

Moreover, the reaction speed is low, so that long reaction periods are required, which, taken in connection with the above-described disadvantages, makes the economy of the method questionable.

SUMMARY OF THE INVENTION

We have now discovered a process for producing bis-(dimethylamino)-phosphoryl fluoride by reacting bis-(dimethylamino)-phosphoryl chloride with an aqueous alkali fluoride or ammonium fluoride solution at elevated temperatures, using a reaction-inert, water-insoluble solvent for bis-(dimethylamino)-phosphoryl chloride. The process is characterized by the fact that to the starting mixture, which contains 30 to 75% water referred to the water-free alkali or ammonium fluoride, we add a phosphate buffer solution of primary and secondary phosphates as well as dimethylamine hydrochloride, and the reaction is carried out at a temperature of 60 to 110° C.

DESCRIPTION OF THE PREFERRED EMBODIMENTS

The optimum quantity of water may vary. However, it is particularly expedient to use small quantities so that in each case at least an oversaturation is obtained at room temperature. In this manner the requirements for buffer solutions are small and the extraction effect is good.

As an alkaline fluoride one uses preferably potassium fluoride in technically pure form. However, in order to achieve good yields it is necessary that it reacts practically neutrally ($n$/10-HCl consumption<0.1 ml./g. potassium fluoride; indicator: α-naphtholphthalein). If necessary, one neutralizes with concentrated hydrochloric acid.

The phosphate buffer solution furnishes a mixture of potassium hydrogen phosphate $KH_2PO_4$ and disodium hydrogen phosphate $Na_2HPO_4$ in aqueous solution and it is computed in such a manner that a pH value is obtained.

By way of example, it is prepared by mixing 10.7 weight parts potassium hydroxide, 30.0 weight parts of sodium hydroxide, 55.4 weight parts of 85% phosphoric acid and 740 weight parts of water. Generally it is sufficient to use 5 to 10% of phosphate buffer solution referred to bis-(dimethylamino)-phosphoryl chloride. Thereby the pH value of the aqueous phase is kept neutral during the conversion.

Bis-(dimethylamino)-phosphoryl chloride can be used in non-purified form as a 12–22%, preferably 18–21% toluene solution. The impurities contained in this solution, for instance phosphoric acid-dimethylamide-dichloride or phosphoric acid-tris-(dimethylamide) as well as traces of dimethylamine and water give no trouble.

Dimethylamine hydrochloride can be used in solid form as well as a liquid, say a 50% solution.

When carrying out this process it has been found that it is advantageous to add to the starting mixture 4 to 10% dimethylamine hydrochloride, referred to bis-(dimethylamino)-phosphoryl chloride. It is possible to increase the yield of bis-(dimethylamino)-phosphoryl fluoride by this method.

Moreover it is surprising that the reaction speed increases.

It is also worth mentioning that concerning the course of the reaction one can achieve a comparatively high uniformity, and losses due to the hydrolysis of bis-(dimethylamino)-phosphoryl fluoride and bis-(dimethylamino)-phosphoryl chloride can be kept low.

EXAMPLE (a) Making a solution of bis-(dimethylamino)-phosphoryl chloride in toluene Into an enameled mixing retort equipped with brine cooling one places one after another, while excluding all atmospheric moisture, 1000 volume parts toluene and 520 weight parts phosphoroxichloride.

The mixture is cooled to 0° C. Under intensive stirring one pipes in thereafter 90% of the theoretically required quantity of diemthylamine in the form of a 31% toluene solution in the course of about 5 hours and at a temperature of 30 to 31° C. After this, cooling is stopped. Another 7% of the theoretically required quantity of dimethylamine are added in the form of a toluene solution in such a manner that the reaction temperature rises to a maximum of 35° C. A total of 97% of the theoretically required quantity of dimethylamine are added.

One permits an after-reaction for one hour at 33 to 35° C. while stirring and separates subsequently in the centrifuge from the solid material (dimethylamine hydrochloride). The latter is washed with 200 volume parts of toluene and the resulting wash toluene is united with the centrifuge runoff. One obtains a total of 2898 weight parts of a toluenic bis-(dimethylamino)-phosphoryl chloride solution with the following composition:

| | Percent |
|---|---|
| Toluene | 80.71 |
| Bis-(dimethylamino)-phosphoryl chloride | 19.18 |
| Phosphoric acid-dimethylamide-dichloride | 0.10 |
| Water | Traces |

The yield of bis-(dimethylamino)-phosphoryl chloride amounts to 99.2% of theoretical, referred to dimethylamine, and 96.2% of theoretical, referred to phosphoroxichloride.

(b) Making bis-(dimethylamino)-phosphoryl fluoride

One places into a reactor which is equipped with an effective stirrer, e.g. a propeller mixer with baffles, and with a heating or cooling jacket, the following, one after another:

122 weight parts water
50 weight parts phosphate buffer solution
26 weight parts dimethylamine hydrochloride
26 weight parts toluene
314 weight parts potassium fluoride
627 weight parts bis-(dimethylamino)-phosphoryl chloride in the form of a 19.18% toluenic solution.

The phosphate buffer solution consists of 10.7 weight parts of potassium hydroxide, 30 weight parts of sodium hydroxide, 55.4 weight parts of an 85% phosphoric acid and 740 parts by weight of water.

The material which has been placed in the reactor is heated, under intensive stirring, to 60 to 70° C. After this the heat is shut off, while the reaction temperature rises to 90 or 95° C.

After a total reaction time of 75 minutes no more bis-(dimethylamino)-phosphoryl chloride can be detected in the toluene phase. It is cooled and the stirrer is stopped. The lower, water-containing layer which has been produced and which consists principally of undissolved potassium chloride and potassium fluoride is washed twice with 200 volume parts of toluene each time and the wash toluene is united with the upper toluene layer.

A total of 3533 weight parts of a solution of bis-(dimethylamino)-phosphoryl fluoride are obtained in toluene, composed as follows:

| | Percent |
|---|---|
| Toluene | 84.52 |
| Bis-(dimethylamino)-phosphoryl fluoride | 14.08 |
| Phosphoric acid-tris-(dimethylamide) | 1.17 |
| Pyrophosphoric acid-tetrakis-(dimethylamide) | 0.20 |

The yield of bis-(dimethylamino)-phosphoryl fluoride is 88% of the theoretical, referred to bis-(dimethylamino) phosphoryl chloride.

The distillative processing of the toluenic solution yields 497 weight parts of a fraction boiling at 103 to 104° C./30 torr which represents pure bis-(dimethylamino)-phosphoryl fluoride.

COMPARISON TEST

The example is repeated, but without adding phosphate buffer solution and dimethylamine hydrochloride.

After a reaction time of 75 minutes only 25% of the bis-(dimethylamino)-phosphoryl chloride used has been converted. Only after 184 minutes it can no longer be detected in the toluene phase. One obtains a total of 3410 weight parts of a solution of bis-(dimethylamino)-phosphoryl chloride in toluene, composed as follows:

87.56% toluene
12.17% bis-(dimethylamino)-phosphoryl fluoride
0.04% phosphoric acid-tris-(dimethylamide)
Traces of pyrophosphoric acid-tetrakis-(dimethylamide.)

The yield of bis-(dimethylamino)-phosphoryl fluoride amounts to 73.2% of the theoretical, referred to bis-(dimethylamino)-phosphoryl chloride.

The invention claimed is:

1. Process for producing bis-(dimethylamino)-phosphoryl fluoride which comprises reacting bis-(dimethylamino)-phosphoryl chloride with a substance selected from the group consisting of an aqueous alkali fluoride solution and an ammonium fluoride solution, said reaction being performed at a temperature of 60–110° C. in a reaction inert water-insoluble solvent for bis-(dimethylamino)-phosphoryl chloride, and said reaction mixture containing 30–75% water referred to the water-free alkali or ammonium fluoride and a phosphate buffer solution of primary and secondary phosphates and dimethylamine hydrochloride, said phosphate buffer solution being a mixture of potassium hydrogen phosphate and disodium hydrogen phosphate in aqueous solution in a quantity such that the resulting pH value is 7.

2. Process according to claim 1, employing a 5 to 10% phosphate buffer solution, referred to bis-(dimethylamino)-phosphoryl chloride.

3. Process according to claim 1, in which dimethylamine hydrochloride is used in a quantity of 4 to 10%, referred to bis-(dimethylamino)-phosphoryl chloride.

References Cited
UNITED STATES PATENTS 2,678,334   5/1954   Hartley _____ 260—543

LORRAINE A. WEINBERGER, Primary Examiner

E. J. GLEIMAN, Assistant Examiner

UNITED STATES PATENT OFFICE
CERTIFICATE OF CORRECTION

Patent No. 3,637,840         Dated Jan. 25, 1972

Inventor(s) Gerhard Kunstle et al.

It is certified that error appears in the above-identified patent and that said Letters Patent are hereby corrected as shown below:

Column 2, line 18 after "pH value" insert -- of 7 --.

Signed and sealed this 27th day of March 1973.

(SEAL)
Attest:

EDWARD M. FLETCHER, JR.
Attesting Officer

ROBERT GOTTSCHALK
Commissioner of Patents